US009462538B2

(12) United States Patent
Chu et al.

(10) Patent No.: US 9,462,538 B2
(45) Date of Patent: Oct. 4, 2016

(54) HIGH THROUGHPUT FEATURES IN 11S MESH NETWORKS

(71) Applicants: STMICROELECTRONICS, INC., Coppell, TX (US); STMICROELECTRONICS S.R.L., Agrate Brianza (IT)

(72) Inventors: Liwen Chu, San Ramon, CA (US); George A. Vlantis, Sunnyvale, CA (US); Vincenzo Scarpa, Lecce (IT)

(73) Assignees: STMICROELECTRONICS, INC., Coppell, TX (US); STMICROELECTRONICS S.R.L., Agrate Brianza (MB) (IT)

( * ) Notice: Subject to any disclaimer, the term of this patent is extended or adjusted under 35 U.S.C. 154(b) by 119 days.

(21) Appl. No.: 14/520,828

(22) Filed: Oct. 22, 2014

(65) Prior Publication Data
US 2015/0036543 A1  Feb. 5, 2015

Related U.S. Application Data

(62) Division of application No. 13/739,857, filed on Jan. 11, 2013, now Pat. No. 8,913,607, which is a division of application No. 12/687,695, filed on Jan. 14, 2010, now Pat. No. 8,374,080.

(60) Provisional application No. 61/144,678, filed on Jan. 14, 2009.

(51) Int. Cl.
*H04L 12/28* (2006.01)
*H04W 48/14* (2009.01)
(Continued)

(52) U.S. Cl.
CPC ............ *H04W 48/14* (2013.01); *H04W 40/34* (2013.01); *H04W 48/08* (2013.01); *H04W 72/02* (2013.01);
(Continued)

(58) Field of Classification Search
CPC ... H04W 40/34; H04W 48/08; H04W 48/14; H04W 72/02; H04W 72/1252; H04W 84/12; H04W 84/18; H04W 84/22; Y02B 60/50
USPC ......... 370/229–238, 254, 310–350, 400–406
See application file for complete search history.

(56) References Cited

U.S. PATENT DOCUMENTS

| 7,623,481 | B2 | 11/2009 | Chen |
| 7,649,833 | B2 * | 1/2010 | Sadri ................... H04B 7/0857 370/208 |
| 7,782,822 | B2 | 8/2010 | Xhafa et al. |
| 7,885,360 | B2 * | 2/2011 | Tanabe ................ H04L 27/3863 327/238 |

(Continued)

OTHER PUBLICATIONS

Abraham et al., "Simple efficient extensible mesh (SEE-Mesh) proposal overview", Doc: IEEE802. 11-05/0567r7, Nov. 2005, pp. 1-83.

(Continued)

*Primary Examiner* — Tri H Phan
(74) *Attorney, Agent, or Firm* — Allen, Dyer, Doppelt, Milbrath & Gilchrist, P.A.

(57) ABSTRACT

The addition of high throughput capability elements to beacon frames and peer link action frames in wireless mesh networks enable the utilization of desirable features without further modifications to the network. Rules can be established for high throughput mesh point protection in a mesh network, Space-time Block Code (STBC) operations and 20/40 MHz operation selections. However, features such as PSMP (power save multi-poll) and PCO (phased coexistence operations) are barred from implementation to prevent collisions.

17 Claims, 5 Drawing Sheets

(51) Int. Cl.

| | | |
|---|---|---|
| *H04W 72/12* | (2009.01) | |
| *H04W 84/18* | (2009.01) | |
| *H04W 40/34* | (2009.01) | |
| *H04W 48/08* | (2009.01) | |
| *H04W 72/02* | (2009.01) | |
| *H04W 84/12* | (2009.01) | |
| *H04W 84/22* | (2009.01) | |

(52) U.S. Cl.
CPC ......... *H04W 72/1252* (2013.01); *H04W 84/18* (2013.01); *H04W 84/12* (2013.01); *H04W 84/22* (2013.01); *Y02B 60/50* (2013.01)

(56) References Cited

U.S. PATENT DOCUMENTS

| | | | | |
|---|---|---|---|---|
| 7,940,794 | B2* | 5/2011 | Zhang | H04W 28/20 370/329 |
| 7,986,966 | B2* | 7/2011 | Sekiya | G01S 7/021 342/159 |
| 8,064,349 | B2 | 11/2011 | Huh et al. | |
| 8,068,454 | B2 | 11/2011 | Bonta et al. | |
| 8,457,020 | B2* | 6/2013 | Smadi | H04W 28/26 370/277 |
| 8,750,932 | B2 | 6/2014 | Zeira et al. | |
| 2003/0156553 | A1 | 8/2003 | Benveniste | |
| 2006/0159003 | A1* | 7/2006 | Nanda | H04W 16/10 370/203 |
| 2007/0133447 | A1 | 6/2007 | Wentink | |
| 2007/0248104 | A1 | 10/2007 | Rudolf et al. | |
| 2007/0258384 | A1 | 11/2007 | Sammour et al. | |
| 2007/0280180 | A1* | 12/2007 | Dalmases | H04W 28/22 370/338 |
| 2008/0013496 | A1* | 1/2008 | Dalmases | H04W 72/0446 370/336 |
| 2008/0137556 | A1 | 6/2008 | Park et al. | |
| 2009/0067403 | A1* | 3/2009 | Chan | H04W 16/10 370/343 |
| 2009/0116410 | A1 | 5/2009 | Seok | |
| 2009/0116430 | A1 | 5/2009 | Bonta et al. | |
| 2009/0168738 | A1* | 7/2009 | Trainin | H04W 16/14 370/342 |
| 2014/0022947 | A1 | 1/2014 | Rudolf et al. | |

OTHER PUBLICATIONS

Chu et al., "IEEE P802.11 Wireless LANs: HT features in 11s MBSS", Doc: 11-08/1258r6, Nov. 2008, pp. 1-3.

Fischer et al., "Joint proposal MAC detail", Doc: IEEE 802.11-05/1165r5, Jan. 2006, pp. 1-76.

Roy et al., "High-throughput multicast routing metrics in wireless mesh networks", School of Electrical and Computer Engineering, Purdue University, no date available, pp. 1-8.

* cited by examiner

HIGH THROUGHPUT FEATURES IN 11S MESH NETWORKS

BACKGROUND OF THE INVENTION

1. Field of the Invention

Embodiments of the present invention relate, in general, to high throughput channel operation in a mesh wireless local area network.

2. Relevant Background

The Institute of Electrical and Electronics Engineers (IEEE) 802.11s is a draft IEEE 802.11 amendment for mesh networking, defining how wireless devices can interconnect to create a WLAN mesh network, which may be used for static topologies and ad-hoc network. 802.11 is generally a set of IEEE standards that govern wireless networking transmission methods. A wireless mesh network is a communications network made up of radio nodes organized in a mesh topology. Wireless mesh networks often consist of mesh clients, mesh routers and gateways. The mesh clients are often laptops, cell phones and other wireless devices while the mesh routers forward traffic to and from the gateways which may, but need not, connect to the Internet. The coverage area of the radio nodes working as a single network is sometimes called a mesh cloud. Access to this mesh cloud is dependent on the radio nodes working in harmony with each other to create a radio network. A mesh network is reliable and offers redundancy. When one node can no longer operate, the rest of the nodes can still communicate with each other, directly or through one or more intermediate nodes.

In the initial Wireless Local Area Network (WLAN) technology, a data rate of 1 to 2 Mbps was supported by the use of frequency hopping, spread spectrum, and infrared communication using a frequency of 2.4 GHz in accordance with the IEEE 802.11 standard. Today IEEE 802.11n provides up to 600 Mbps. The IEEE 802.11 standard has developed or is developing a variety of technical standards for improvement in quality of service (QoS), compatibility of an access point (AP) protocol, security enhancement, wireless resource measurement, wireless access in vehicular environment, fast roaming, wireless mesh network, interworking with external networks, wireless network management, and the like.

FIG. 1 is a diagram of a mesh network 100 in accordance with the present invention and as known to one skilled in the relevant art. The mesh network 100 comprises a plurality of interconnected mesh points 130, 135. The mesh network 100 may also include a mesh portal 120. The mesh portal 120 is a mesh point that has a connection with an external network 110, (e.g., a wired network). Some of the mesh points may be mesh APs 135. Each of the mesh APs 135 is a mesh point that also works as an AP in its own basic service set 160, 170. A mesh AP 135 can act, in one instance, as a non-mesh AP to serve local stations 150 in its BSS 160, 170, and in another instance, act as a wireless bridge to receive, forward and route packets through the mesh network 100.

Recall that a "wireless mesh network" can support direct communication between plural wireless stations having a relay function. In view of functionality, a distribution system (DS) for plural APs can be replaced with an inter-operable wireless link or a multi-hop path between the plural wireless stations. In the mesh network, one wireless station can set up a peer-to-peer wireless link (peer link) with one or more neighboring wireless stations, thereby constructing a more flexible network. Thus, plural communication paths can exist between two wireless stations. Among them, the direct communication paths between two wireless stations are called a wireless mesh link or a mesh peer link or a peer link. In a mesh network, wireless stations are called mesh points (MP). A wireless station performing the function of an AP is called a mesh access point (MAP).

Such a wireless mesh network has advantages, such as flexibility in constructing a network, reliability due to bypass paths, reduction in power consumption due to a decrease in communication distance. More specifically, it is possible to construct a flexible network by using the mesh network even in places not including any wired communication network. In the mesh network, the plural MPs can be connected to each other to guarantee plural bypass paths. Accordingly, even when one MP is out of order, data can be transmitted through another path. In the mesh network, since the communication can be made through a neighboring MP, it is possible for terminals to communicate with lower power.

IEEE 802.11s provides a means to form a mesh wireless backhaul with IEEE 802.11 WLAN technology. Mesh networks, also known as multi-hop networks, enable data packets to be relayed more than once in order to reach their destination. This presents a different paradigm as compared to the original WLAN standard, which addresses only star topologies for stations (STAs) to be connected to an access point, effectively using single hop communications through a basic service set (BSS).

IEEE 802.11s addresses network nodes that form a mesh network and the WLAN mesh operation in the backhaul that is transparent to all STAs. This means that, similar to legacy IEEE 802.11 WLAN, STAs still connect to an AP, (i.e., mesh AP having a mesh capability), through a BSS. The mesh AP interfaces to other mesh points, which forward and route traffic through the mesh network to a destination. The destination may be a mesh portal, which routes the traffic to the external network, or may be another mesh AP attached to the mesh network. By choosing this approach, even legacy STAs may still operate in a mesh-enabled WLAN. The communication between STAs and a mesh AP in a BSS is completely independent from the mesh network.

The IEEE 802.11n is another specification for providing a high throughput (HT) WLAN. Some of the IEEE 802.11n throughput-enhancing features are aggregation, enhanced block acknowledgement (BA), reverse direction grant, power save multiple poll (PSMP), and operational bandwidth. In IEEE 802.11n, a data rate is increased by annexing or bonding two adjacent channels. The data rate increase is also achieved by using several more data tones, with 802.11 40 MHz operation relative to 2.times.20 MHz channel occupancy with 802.11a/g. However, not all IEEE 802.11n devices may support 40 MHz operation and, therefore, the transition of operation from 20 MHz to 40 MHz must be managed efficiently. In order to achieve this, the IEEE 802.11n standard provides some channel management mechanisms.

In IEEE 802.11n, three operating modes are allowed according to bandwidth and BSS capability: 20 MHz operation, 20/40 MHz operation and Phased Coexistence Operation (PCO). Each of these modes has associated rules of operation. In a 20 MHz operation, all STAs will operate only in a 20 MHz mode whether or not the STAs are 20 MHz or 20/40 MHz capable. In a 20/40 MHz operation, STAs choose the bandwidth by using a transmission channel width action message. In addition, a 40 MHz device will protect its transmission with legacy control frames, such as request-to-send (RTS) or clear-to-send (CTS) frames, if the AP of its BSS indicates that there are 20 MHz and/or legacy STAs in the BSS. In the PCO mode, which is an optional mechanism, the BSS alternates between 20 MHz and 40 MHz modes.

There are three operation modes in the current 802.11 standard: infrastructure BSS, independent BSS and mesh network. In infrastructure BSS, an AP is the controller of the BSS. In independent BSS, there is no central controller and no association between STAs. In mesh network, there is no central controller but neighbor MPs associated with each other 802.11n has features that does not require central controller or peer coordination, and features that require central controller or peer coordination.

The features that do not require central controller or peer coordination can be used in a mesh network without any change after the addition of HT capability to beacon and peer link frames. These capabilities include Aggregated-MAC Service Data Unit (A-MSDU), Aggregated-MAC Protocol Data Unit (A-MPDU), enhanced block acknowledgement, reverse direction grant, beam forming and antenna selection (ASEL).

In IEEE 802.11s, HT information elements control the operation of HT STAB in the mesh network. To effect such control, an infrastructure BSS uses all fields in the HT information element to define the operation of the HT STAB independent BSS use fields that are not reserved to define the operation of HT STAB. Unfortunately, it is unclear what fields will be used or reserved in a mesh network, and it is not clear how features such as power save multi-poll, HT protection, Space Time Block Coding (STBC) operation, 20/40 MHz operation, and phased coexistence operations will be used, or whether features such as PSMP or PCO operations should be allowed at all.

A need therefore exists to identify HT features in a IEEE 802.11s mesh network. These and other deficiencies of the prior art are addressed by one or more embodiments of the present invention.

SUMMARY OF THE INVENTION

The addition of HT capability elements to beacon frames and peer link action frames in wireless mesh networks enable features such as A-MSDU, A-MPDU, Enhanced BlockAck, reverse direction, beam forming and antenna selection to be used without further modifications. Rules can be established for HT mesh point protection in a mesh network, Space-time Block Code (STBC) operations, and 20/40 MHz operation selections. However, HT features such as PSMP and PCO operations should be disallowed in wireless mesh networks.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
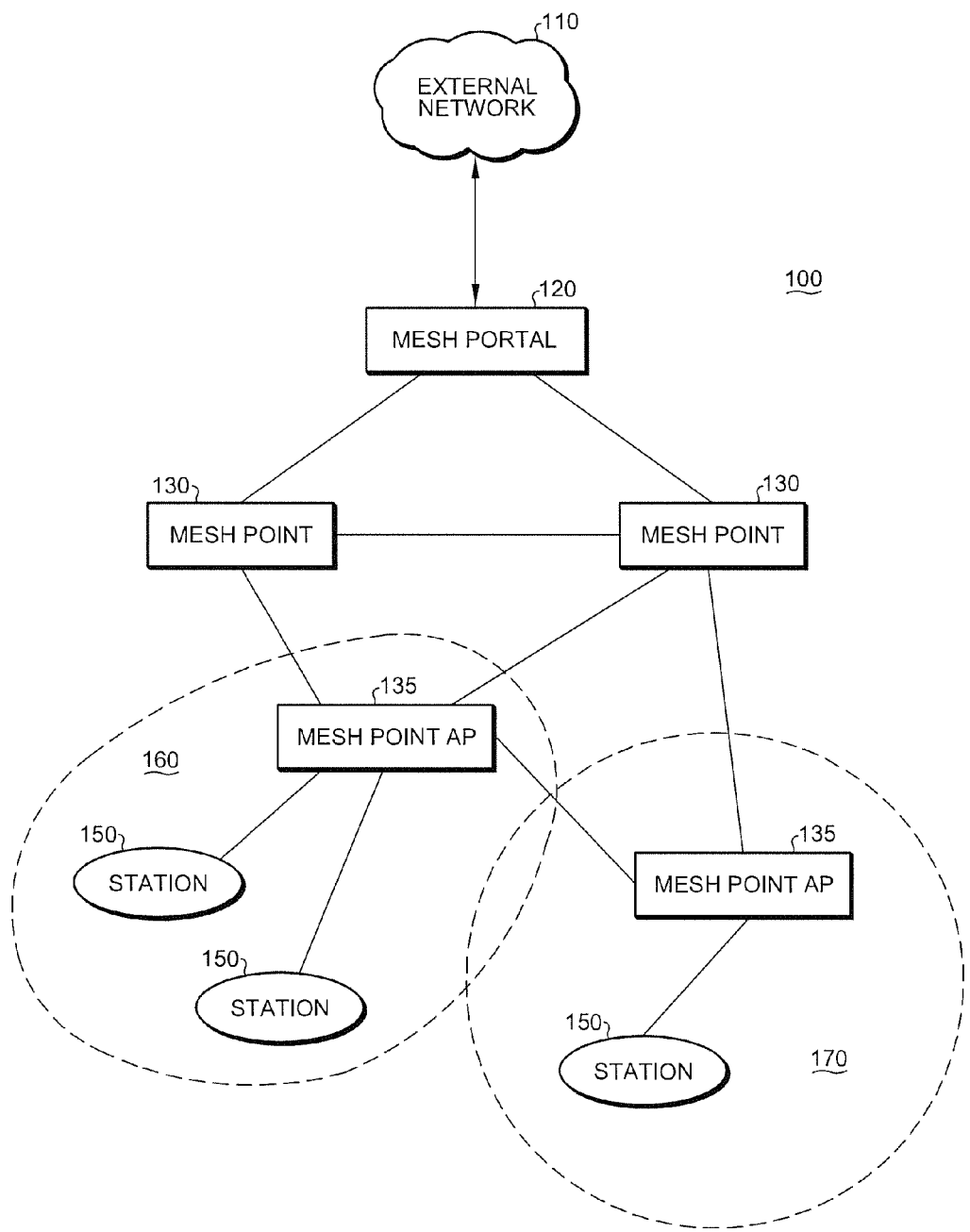
FIG. 1 shows a wireless mesh network as applicable to the present invention and as known in the prior art.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

As previously described, a wireless mesh network can support direct communication between a plurality of mesh points. The distributed APs are coupled with an interoperable wireless link, or multi-hop path, between the wireless stations. In such a wireless mesh network, one wireless station can set up a peer-to-peer wireless link with one or more neighboring stations, thus forming a network. This forms multiple communication paths between two wireless stations. When two stations form a direct communication path, such a path is called a mesh peer link or simply a peer link.

In such a wireless mesh network, a beacon frame is a frame comprising management information about the wireless network. Beacon frames are transmitted by mesh points periodically to announce the presence and configuration of a wireless mesh network. Typically in BSS network beacon frames are transmitted from an AP within a BSS so that other STAs within the BSS will be aware of the BSS structure. In an independent BSS network, beacon generation is distributed among the stations within the network.

Aspects of the present invention relate to HT capability in a mesh network. Specifically, the addition of HT capability in beacon frames and peer link action frames are addressed.

According to one embodiment of the present invention, two HT features are barred from implementation in a mesh network. These HT features include PSMP (power save multi-poll) and PCO (phased coexistence operations). In frame transmissions between devices in a wireless communication system that implements power saving multi-poll, a power saving sequence begins with the transmission of an un-aggregated power save multi-poll frame, and terminates when the last scheduled uplink transmission ends.

IEEE 802.11n provides a high data rate WLAN standard which allows a maximum throughput of at least 130 Mbps.

The amended n specification provides a power management scheme termed PSMP. Frame transmissions between an AP and a STA implements PSMP.

The PSMP frame is a broadcast/multicast packet. As a result, it is highly likely that such a packet can collide with other simultaneous transmissions. Conventional approaches suitable for protecting unicast packets are also not effective in protecting the PSMP frame against collisions. For example, an RTS/CTS exchange has conventionally been used to protect unicast packet delivery. However, this is not suitable for broadcast/multicast packets such as the PSMP frame.

Another conventional approach is to transmit the PSMP MPDU at a base rate or to precede the transmission of the PSMP MPDU by a CTS (i.e., CTS-to-self) frame with the receiver address (RA) field set to the initiator's (e.g., the AP's) own media access control (MAC) address. However, neither approach can fully protect the PSMP frame sequence if overlap BSS cannot be reached by AP's transmission. Therefore, it is quite possible that the PSMP frame is not correctly received by one or more PSMP-enabled STAs in a PSMP sequence.

Nonetheless, a PSMP sequence allows the AP to create effective service periods for Automatic Power Save Delivery (APSD). Multiple-Traffic Identifiers (TID) BlockAck can allow for single frames to respond to implicit BAR over multiple-TID; but, as previously stated, a 2-hop MP may create more collisions when a distributed channel access (EDCA) is used for PSMP, as no RTS/CTS protection for the downlink burst can be used.

One alternative is to combine mesh coordinated channel access (MCCA) and PSMP. Such a combination is likely to increase link efficiency, however, the merger of PSMP and MCCA alters the original mechanism of MCCA since EDCA or PIFS of the highest access category will be used by the MP. The result will be multiple access category frames being transmitted in a MCCA transmitting operation, and the mesh point will send unicast frames to more than one destination MP. For at least these reasons, PSMP is not suited for HT wireless mesh network communications under 802.11s.

Another mode of operation which is not suited for operation in a wireless mesh network is phased co-existence operations (PCO). In IEEE 802.11n, three operating modes are allowed according to bandwidth and BSS capability: 20 MHz operation, 20/40 MHz operation and Phased Coexistence Operation (PCO). In the PCO mode, the BSS alternates between 20 MHz and 40 MHz modes. In the 20 MHz phase, independent BSS activity is allowed on the control channel and on the extension channel. In a 40 MHz phase, 40 MHz transmissions occur across the 40 MHz channel. However, the 40 MHz HT frames in the 40 MHz phase are not protected with a hidden 20 MHz MP. If two 40 MHz MPs have overlapped phases, when a first MP ends its 40 MHz phase using CF-end, the second MP's 40 MHz phase may also, inadvertently, be ended. As a result, data may be lost. Thus, as with PSMP, PCO HT operations should not be allowed in 802.11s mesh network operations.

While according to one embodiment of the present invention, PSMP and PCO HT features are prevented from implementation in a mesh network under 802.11s, other features can be effectively used. Under the correct methodology HT protection, STBC operations and 20/40 MHz operation sections can be effectively implemented.

In order to allow two or more MPs to set up peer links with each other to form a mesh network or to allow a different MP to participate in an existing mesh network, the mesh profiles of the MPs to set up the peer links should be necessarily equal to each other. The MPs support at least one mesh profiles. The mesh profile includes a mesh ID, a path selection protocol ID, and a path selection metric ID. The mesh profile may further include a congestion control mode ID.

A MP also having the function of an AP is particularly called a MAP. Accordingly, the MAPs in a mesh network also perform the function of an AP for wireless stations associated therewith. The AP may be called convergence controller, BS, node-B, or site controller, in addition to the title of access point.

Since the mesh profiles of the MPs should be necessarily equal to each other to participate in a mesh network for communication, the MPs should have sufficient information element on themselves and the neighboring MPs. Procedures of allowing an MP to participate in a mesh network, to detect the change in connectivity in the mesh network, and to react with the change include a mesh discovery procedure and a mesh peer link management procedure in the mesh network. The mesh discovery procedure is to allow an MP to discover latent neighboring MPs, by passive scanning using beacon frames transmitted from the neighboring MPs or active scanning using the exchange of probe request frames and probe response frames between two MPs, and to discover neighboring MPs having the same mesh profile among the latent neighboring MPs (peer link). The mesh peer link management procedure is used to set up the peer links between the MPs, to manage the peer links, and to tear down the peer links.

As described above, the mesh discovery procedure is designed to detect candidate peer MPs and characteristics thereof, and includes procedures before and after the MPs participate in the mesh network. The configured MP has at least one mesh profile. When the MP is a member of a specific mesh network, one mesh profile is accurately activated.

The mesh discovery procedure for discovering the neighboring MPs includes allowing the MP to perform passive or active scanning. In the case of the active scanning, a first MP transmits a probe request frame including the mesh ID information. Only second MPs having the same mesh ID information among the MPs having received the probe request frame transmits a probe response frame in response thereto. The probe response frame includes a mesh configuration element. The first MP can know profile information of the second MPs, having transmitted the probe response frame on the basis of the information included in the mesh configuration element. Thus a peer link is established.

Another mesh discovery procedure for discovering the neighboring MPs uses beacon frames periodically transmitted from the neighboring MPs. Since beacon frames transmitted from the MPs in the mesh network include the mesh ID information and the mesh configuration information, the MP receiving the beacon frames can know the mesh profile of the transmitting MP. The mesh configuration information included in the beacon frame is substantially the same as the information included in the probe request frame or the probe response frame, and thus, detailed description thereof is omitted.

When an MP discovers the neighboring MPs using one of the above-mentioned mesh discovery procedures, the MP tries to perform the mesh link setup procedure with the discovered neighboring MPs. The mesh link setup procedure is to set up logical links between the MPs and is a procedure for setting up peer links between the MPs, which is also called a peering procedure. In the mesh network, the MPs can transmit and receive data frames or management frames (except for management frames for the mesh discovery procedure or the peer link management procedure) after the mesh peer links are set up by the peering procedure. The MPs transmit and receive a peer link open frame and a peer link confirmation frame to set up the mesh peer links between the MPs.

When the MP transmitting the beacon frame, association frame, peer link open frame is an MP supporting HT, that is, an HT MP, the body portion of the beacon frame, association frame, open frame includes an HT information element or an HT operation information element. The HT information element or the HT operation information element includes information for controlling the operation of the HT MP in the mesh network. The HT capability information element is used to notify to the opposite MP that the HT MP supports HT. The HT capability information element should necessarily be included in the peer link to use the HT service in the mesh network. Accordingly, the HT MP transmits to the opposite MP the HT feature indicating that it supports HT functions.

According to one embodiment of the present invention, one of the supported HT features is HT protection. HT transmissions are protected based on HT protection, non-green HT STAs present in the mesh network, OBSS non-HT STAs present in the mesh network, and L-SIG transmit operations having full protection support. In a mesh network having a HT BSS, HT protection can be set to one of several modes. These modes include: 1) HT no protection mode; 2) HT non-member protection mode; 3) HT 20 MHz protection mode; and 4) HT non-HT mixed mode. The selection of one of these modes is dependent on the mesh network environment.

In an independent BSS, the HT protection field is reserved. However, an HT STA can protect transmissions just as if fields are set to a protective mode. For example, if the HT STA fields are set so as to have HT protection set to non-HT mixed, RIFS of HT information element set to 1, non-green field HT STA present field set to 1, L-SIG transmit operation full support field set to 0, OBSS non-HT STA set to 1 and PCO active field set to 0, the STA will protect the HT transmission.

In a non-HT BSS, an HT STA operating a direct link (peer) with another HT STA can also operate to protect HT transmissions. Again, the STA will protect the HT transmission when the HT STA fields are set so as to have HT protection set to non-HT mixed, RIFS of HT information element set to 1, non-green field HT STA present field set to 1, L-SIG transmit operation full support field set to 0, OBSS non-HT STA set to 1, PCO active field set to 0 and basic MCS field set to 0.

Figure 2:
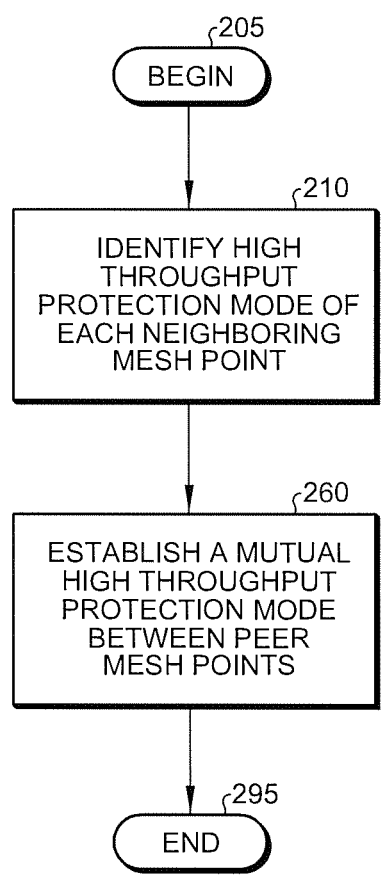
FIG. 2 is a flowchart of one embodiment of the present invention for establishing mutual high throughput protection in a wireless mesh network FIGS. 3A and 3B taken together is a flowchart of a method embodiment of the present invention for establishing high throughput protection in a wireless mesh network.

One embodiment of the present invention identifies that HT transmissions from a STA in a mesh network can be protected based on the capabilities of its neighboring STAs. FIG. 2 shows a flowchart of a method for establishing a mutual high throughput protection mode between a pair of mesh points so that the two mesh points can communicate. At a basic level, the high throughput communication begins 205 with the identification 210 of the protection mode of a mesh point and its neighbors. Thereafter, a mutual high throughput protection mode can be established 260 such that communications can exist 295 between a mesh point and each of its neighbors. Note that a mesh point may interact with several neighboring mesh points, each with differing high throughput protection modes. The present invention enables high throughput protection communications to occur in a wireless mesh network characterized by multiple high throughput protection modes.

Included in the following description are flowcharts depicting examples of the methodology which may be used to facilitate high throughput communications between mesh points in a wireless mesh network. In the description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Figure 3A:
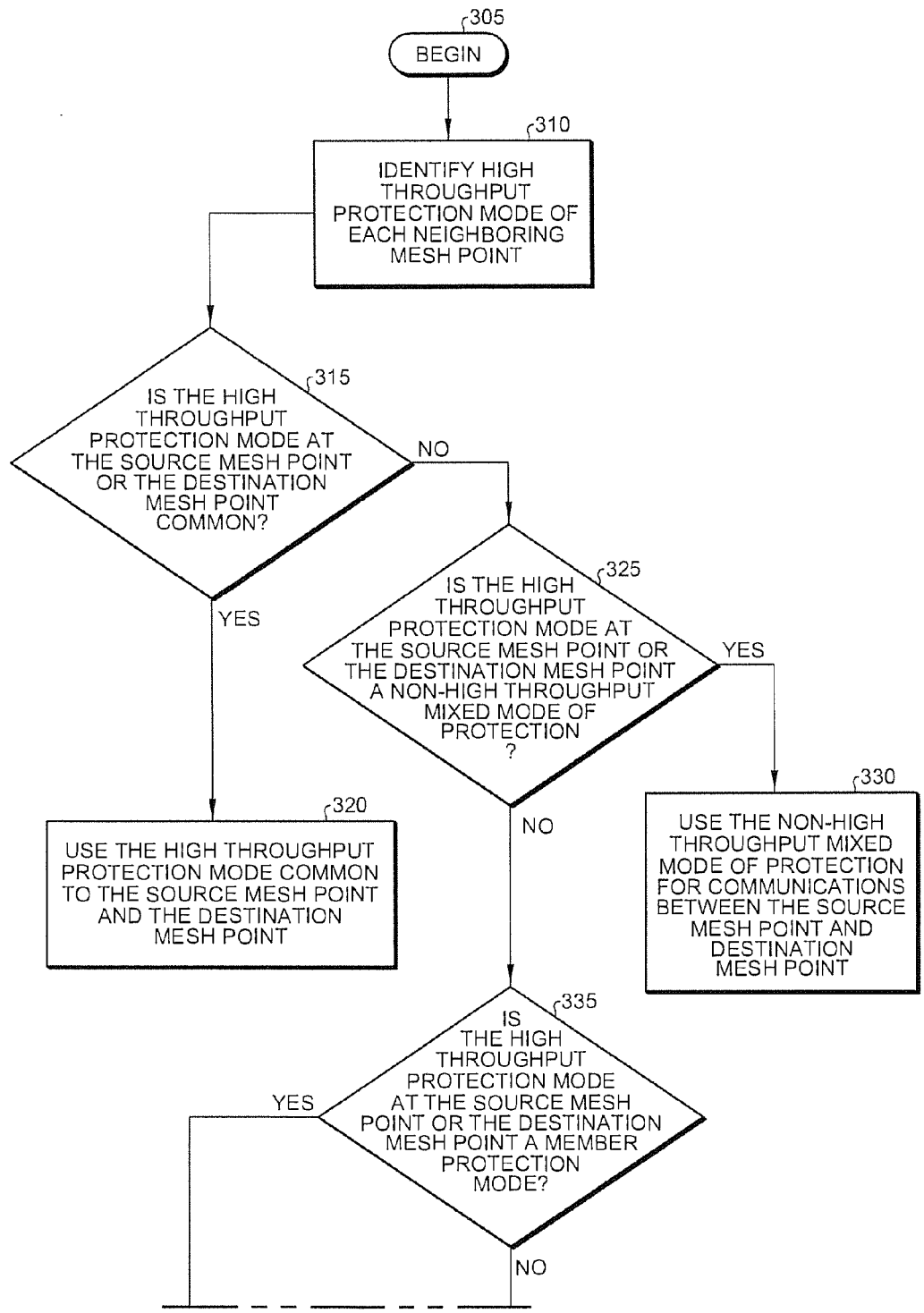
Figure 3B:
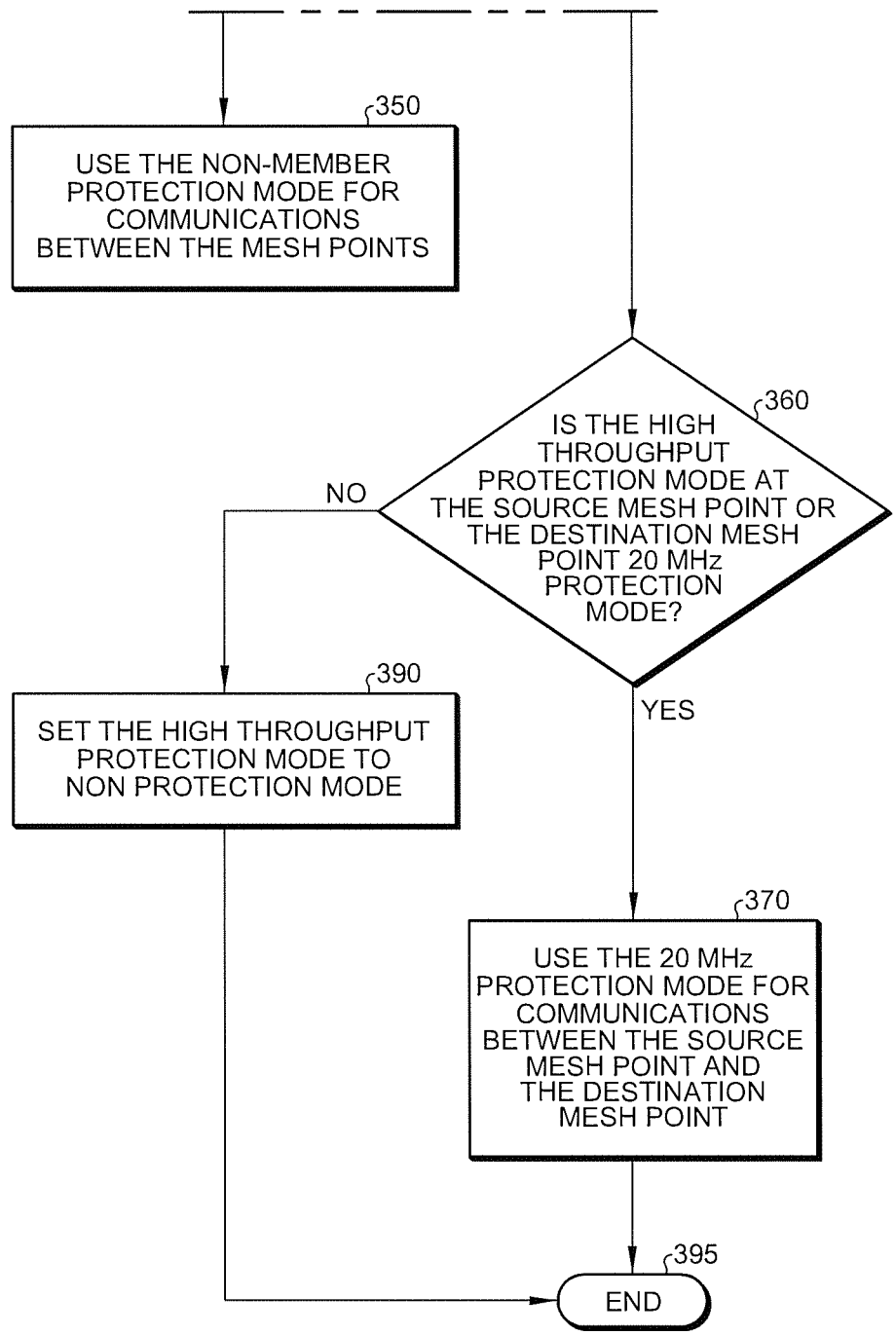

FIGS. 3A and 3B taken together is a detailed flowchart of a method for establishing high throughput protection modes fostering high throughput communications between mesh points. According to one embodiment of the present invention, a HT MP can set its protection mode according to the capabilities of its neighboring MPs and STAs in the primary channel or in the secondary channel in a 20/40 MHz mesh network.

When two peer MPs report the same HT protection mode in the HT protection field, protection methods related to that mode will be used in the BSS. When two peer MPs report differing protection modes, the protection mode varies. When one MP reports non-HT mixed mode (the other reporting protection mode other than non-HT mixed mode) the protection methods of the non-HT mixed mode MP will be used for transmissions between these two MPs.

When one MP reports a non-member protection mode of operation and a non-HT mixed mode is not reported by any other MP, the protection methods of a non-member protection mode will be used for transmissions between these two MPs. Lastly when one MP reports a 20 MHz protection mode and neither a non-HT mixed mode nor non-member mode is reported by any MP, then the protection method of 20 MHz protection operations are used for the transmissions between the two MPs.

Accordingly, methodology for determining HT MP protection rules in a mesh network can be fashioned. The process begins 305 with determining what type of protection mode is desired and identifying 310 what protection modes exist at each mesh point. A query 315 is made to ask whether the mesh point and its neighbor that need to transmit frame with in the TXOP possess a common high throughput protection mode. If the response is yes, then communications between that mesh point and the related neighbor is based on the common high throughput protection mode 320. In the situation where the HT protection field is to be set to a non-HT mixed protection mode 325 at a mesh point, a determination must first be made that at least one of its neighbor mesh point within the mesh network detected on either the primary or secondary channel are non-HT STA. If this criteria is met, then the HT protection field can be set to a non-HT mixed protection mode 330 for communications between the mesh points.

According to another embodiment of the present invention, the HT protection field can be set to non-member protection mode when it is determined 335 that a non-HT STA, detected in either the primary or secondary channel or in both the primary or secondary channels, is not known by the MP not to be a member of the mesh network, and all the neighbor mesh points detected in both the primary or secondary channels, are HT mesh points. Secondly, a determination is made that there is no non-HT mixed mode of HT protection reported by any of the source mesh point or destination mesh point. If so, the HT protection field can be set 350 to a non-member protection mode in the transmission between these two source and destination mesh points.

The HT protection field can also, according to another embodiment of the present invention, be set to 20 MHz protection mode 370 when all STAs detected in the primary and secondary channels by the source and destination mesh points are HT STAs, and the source or destination MP are HT MPs using 20 MHz protection 360. In addition, the mesh network can be determined to be a 20/40 MHz mesh network when at least one 20 MHz HT MP is one-hop away from the source MP or the destination MP.

When the HT protection field is not set to a non-protection mode, a non-member protection mode or a 20 MHz protection mode, the HT protection field is set 390 to a non-protection mode ending 395 the process.

Thus, in summary, when two peer HT MPs report the same protection mode in their respective HT protection fields, the protection mechanisms of the related mode are used to protect the transmissions between the peer HT MPs. When a HT MP and its peer HT MP report different protection modes in their respective HT protection fields, one of the following rules are applied to the transmission between these two mesh points. When a HT MP or its peer HT MP reports a non-HT mixed mode, then the protection mechanisms of a non-HT mixed mode are used to protect the transmission between the peer HT MPs. The transmission between peer HT MPs are protected by the mechanisms of the non-member mode when a HT MP or its peer HT MP reports a non-member protection mode and a non-HT mixed mode is not reported by any of the two peer HT MPs. Finally, when a HT MP or its peer HT MP reports a 20 MHz protection mode and neither a non-HT mixed nor a non-member protection mode are reported by any of the HT MPs, then the protection mechanisms of a 20 MHz protection mode is used to protect the transmission between the peer HT MPs.

Figure 4:
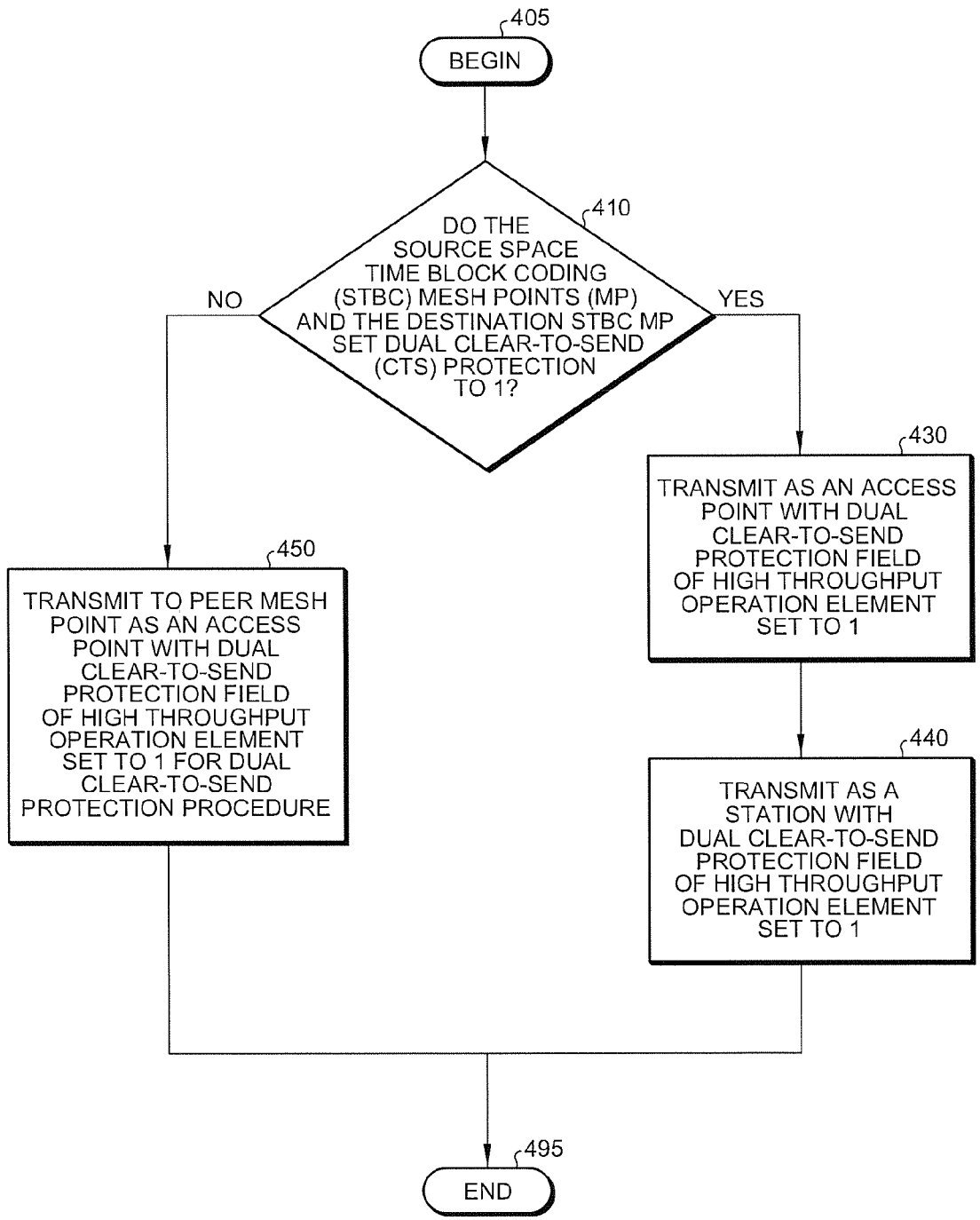
FIG. 4 is a flow chart of a method embodiment of the present invention for establishing high throughput communications between STBC mesh points in a wireless mesh network.

According to another embodiment of the present invention, STBC can be implemented to achieve significant error rate improvements over single antenna systems. FIG. 4 shows a high level flow chart for high throughput STBC implementation. STBC related operations include dual beaconing and dual CTS protection. According to one embodiment of the present invention, a process for STBC implementation begins 405 with a STBC MP sending out a non-STBC beacon and, when indicated in the HT information element, a STBC beacon. The beacon frame also indicates if the dual CTS protection is required for the mesh point transmitting the beacon frame. If both peer HT MPs set their dual CTS protection field of the HT operation element to 1 in the mesh beacon frames 410, then the transmitter can act as an AP 430 with the dual CTS protection field of the HT operation element set to 1 for dual CTS protection procedures. The transmitter may also act as the STA 440 for the dual CTS protection procedures.

When a HT MP sets the dual CTS protection field of the HT operation element to 1 in the mesh beacon frame, and its peer HT MP does not set the dual CTS protection field of the HT operation element to 1 in the mesh beacon frame, the HT MP acts as an AP 450 with a dual CTS protection field of the HT operation element set to 1 for dual CTS protection procedures when communicating with its peer MP. By following these procedures, HT STBC operational features can be allowed in 802.11s mesh networks 495.

20/40 MHz operations can also be included in 802.11s mesh networks. 20/40 MHz operations include channel scanning and channel management. An AP can switch an infrastructure BSS between a 20/40 MHz BSS and a 20 MHz BSS. Moreover a 20/40 MHz independent BSS cannot be changed to a 20 MHz BSS nor can a 20 MHz independent BSS be changed to a 20/40 MHz BSS.

802.11s mesh networks, according to one embodiment of the present invention, can support switching between a 20/40 MHz mode and a 20 MHz mode when a robust distributed channel switch mechanism is defined.

When a mesh network switches between 20/40 MHz and 20 MHz, peer MPs renegotiate mesh coordinated channel access duration parameters. The renegotiation procedure is started by the mesh point with its working channel bandwidth change since, after such channel change, the medium time (MCCAOP duration, MCCAOP periodicity) required by the traffic stream also changes. The renegotiation procedure is defined by MCCA protocol. After such a switch, each MP can accomplish path maintenance to find an optimized path. If the working channel bandwidth changes, the air-time metric also changes. So the optimized path may also change. The optimized path finding procedure is defined by the HWMP protocol.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with wireless mesh networks, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A wireless mesh network comprising:
   a plurality of mesh points coupled together in a wireless mesh network arrangement, with at least some of the mesh points configured to support a 20/40 MHz mode of operation and to switch from the 20/40 MHz mode of operation to a 20 MHz mode of operation, and with at least one of the mesh pints configured to
   detect neighboring mesh points,
   establish a peer link with at least one neighboring mesh point by direct communications therewith,
   identify a high throughput protection mode of the at least one neighboring mesh point,
   establish a high throughput protection mode for transmission between the at least one neighboring mesh point with the established peer link, and
   with the high throughput protection mode being associated with a secondary channel in the 20/40 MHz mode of operation.

2. The high throughput wireless mesh network of claim 1 wherein responsive to switching between the 20/40 MHz mode of operation and the 20 MHz mode of operation, the at least some of the mesh points are configured to renegotiate mesh coordinated channel access duration parameters.

3. The high throughput wireless mesh network of claim 1 wherein responsive to switching between the 20/40 MHz mode of operation and the 20 MHz mode of operation, the at least some of the mesh points are configured to conduct path maintenance to identify a new path.

4. The high throughput wireless mesh network of claim 3 wherein the new path comprises an optimized path.

5. The high throughput wireless mesh network of claim 1 wherein each mesh point is configured to detect neighboring mesh points by passive scanning of wireless transmission channels for beacon frames transmitted by the neighboring mesh points.

6. The high throughput wireless mesh network of claim 1 wherein each mesh point is configured to detect neighboring mesh points by transmitting and receiving probe request frames and probe response frames in communication with the neighboring mesh frames.

7. The high throughput wireless mesh network of claim 1 wherein each mesh point comprises a controller and a memory coupled thereto.

8. The high throughput wireless mesh network of claim 1 wherein each mesh point further comprises a radio configured to establish at least one radio link.

9. A wireless mesh network comprising:
   a plurality of mesh points coupled together in a wireless mesh network arrangement, each mesh point comprising a controller and a memory coupled thereto, and a radio coupled to the controller;
   at least some of the mesh points configured to support a 20/40 MHz mode of operation and to switch from the 20/40 MHz mode of operation to a 20 MHz mode of operation; and with at least one of the mesh pints configured to
   detect neighboring mesh points,
   establish a peer link with at least one neighboring mesh point by direct communications therewith,
   identify a high throughput protection mode of the at least one neighboring mesh point,
   establish a high throughput protection mode for transmission between the at least one neighboring mesh point with the established peer link, and
   with the high throughput protection mode being associated with a secondary channel in the 20/40 MHz mode of operation; and
   wherein responsive to switching between the 20/40 MHz mode of operation and the 20 MHz mode of operation, the at least some of the mesh points are configured to renegotiate mesh coordinated channel access duration parameters.

10. The high throughput wireless mesh network of claim 9 wherein responsive to switching between the 20/40 MHz mode of operation and the 20 MHz mode of operation, the at least some of the mesh points are configured to conduct path maintenance to identify a new path.

11. The high throughput wireless mesh network of claim 10 wherein the new path comprises an optimized path.

12. The high throughput wireless mesh network of claim 9 wherein each mesh point is configured to detect neighboring mesh points by passive scanning of wireless transmission channels for beacon frames transmitted by the neighboring mesh points.

13. The high throughput wireless mesh network of claim 9 wherein each mesh point is configured to detect neighboring mesh points by transmitting and receiving probe request frames and probe response frames in communication with the neighboring mesh frames.

14. A wireless mesh network comprising:
   a plurality of mesh points coupled together in a wireless mesh network arrangement, each mesh point comprising a controller and a memory coupled thereto, and a radio coupled to the controller;
   at least some of the mesh points configured to support a 20/40 MHz mode of operation and to switch from the 20/40 MHz mode of operation to a 20 MHz mode of operation; and with at least one of the mesh pints configured to
   detect neighboring mesh points,
   establish a peer link with at least one neighboring mesh point by direct communications therewith,
   identify a high throughput protection mode of the at least one neighboring mesh point, establish a high throughput protection mode for transmission between the at least one neighboring mesh point with the established peer link, and with the high throughput protection mode being associated with a secondary channel in the 20/40 MHz mode of operation; and wherein responsive to switching between the 20/40 MHz mode of operation and the 20 MHz mode of operation, the at least some of the mesh points are configured to conduct path maintenance to identify a new path.

15. The high throughput wireless mesh network of claim 14 wherein the new path comprises an optimized path.

16. The high throughput wireless mesh network of claim 14 wherein each mesh point is configured to detect neighboring mesh points by passive scanning of wireless transmission channels for beacon frames transmitted by the neighboring mesh points.

17. The high throughput wireless mesh network of claim 14 wherein each mesh point is configured to detect neighboring mesh points by transmitting and receiving probe request frames and probe response frames in communication with the neighboring mesh frames.

* * * * *